United States Patent
Kuo

(10) Patent No.: US 6,987,981 B2
(45) Date of Patent: Jan. 17, 2006

(54) ROBUST RLC RESET PROCEDURE IN A WIRELESS COMMUNICATION SYSTEM

(75) Inventor: Lee-Chee Kuo, Hsinchu (TW)

(73) Assignee: AsusTek Computer Inc., Taipei (TW)

( * ) Notice: Subject to any disclaimer, the term of this patent is extended or adjusted under 35 U.S.C. 154(b) by 486 days.

(21) Appl. No.: 10/122,436

(22) Filed: Apr. 12, 2002

(65) Prior Publication Data

US 2003/0092458 A1   May 15, 2003

Related U.S. Application Data

(60) Provisional application No. 60/338,148, filed on Nov. 13, 2001.

(51) Int. Cl.
*H04B 15/00*   (2006.01)

(52) U.S. Cl. ............... 455/502; 455/517; 370/324; 370/453; 370/503

(58) Field of Classification Search ............... 455/517, 455/502, 515, 445, 403; 370/503, 328, 338, 370/356, 324, 453; 714/701, 707; 375/356
See application file for complete search history.

(56) References Cited

U.S. PATENT DOCUMENTS

2001/0029188 A1 * 10/2001 Sarkkinen et al. .......... 455/517

OTHER PUBLICATIONS

3rd Generation Partnership Project; Technical Specification Group Radio Access Betwork; RLC protocal specification (relase 1999).

* cited by examiner

*Primary Examiner*—Edan Orgad
*Assistant Examiner*—Raymond S. Dean
(74) *Attorney, Agent, or Firm*—Winston Hsu

(57) ABSTRACT

In the AM RLC reset procedure of a wireless communication system, a delayed Reset ACK PDU will cause unsynchronization between the Sender and the Receiver. This invention of method and system checks for arriving of the first and the second Reset PDUs and the first and the second Reset ACK PDUs first, then selectively updates the status-related variables and HFN values to synchronize the Sender and the Receiver.

4 Claims, 8 Drawing Sheets

ROBUST RLC RESET PROCEDURE IN A WIRELESS COMMUNICATION SYSTEM

CROSS REFERENCE APPLICATIONS

This application claims priority from U.S. Provisional Patent Application No. 60/338,148, filed on Nov. 13, 2001.

BACKGROUND

The present invention relates to a wireless communication system and methods. More particularly, the invention relates to a robust RLC reset method and system in a wireless communication environment.

In a wireless communication system, all communication contents will be packaged in Protocol Data Unit (PDU) format. Refers to FIG. 1, a typical PDU consists a number of bytes (octets), where various bit-size fields are defined. For example, shown in FIG. 1, the one-bit D/C field 12 indicates whether the type of an AM PDU is a data or a control PDU. The 3-bits PDU TYPE field 14 indicates what kind of control type the PDU is. The 1-bit Reset Sequence Number (RSN) 16 is used to indicate the sequence of the transmitted Reset PDU. If this Reset PDU is a retransmission of an original Reset PDU, the RSN value is same as the original Reset PDU. Otherwise, the RSN value is toggled to the next RSN value. Its initial value is 0. The value will be reinitialized every time the RLC is re-established. But it will not be reinitialized when the RLC is reset. The 3-bits Reserved 1 (R1) field 18 is reserved for future functions. The 20-bits Hyper Frame Number Indictor (HFNI) field 20 is used to indicate the Hyper Frame Number (HFN), which helps to track the synchronization between a Sender and a Receiver. A Sender can be a User Equipment (UE) or an UTRAN (Universal Terrestrial Radio Access Network) and so is a Receiver. And the last field—the PAD field 22 is used to make sure the minimum length of the PDU. In general, a transmission from the UE to the UTRAN is called an Uplink transmission (UL) while the transmission from the UTRAN to the UE is called a Downlink transmission (DL).

Under certain conditions in an Acknowledge Mode (AM), either a Sender or a Receiver will initiate a reset procedure if one sends too many retries—the number of retries has exceeded the maximum number of retransmission, or one receives a PDU with erroneous sequence number. As shown in FIG. 2, in a normal AM RLC (Radio Link Control) reset procedure, a Sender 30 initiates a reset procedure during transmission. The Sender 30 sends a Reset PDU (stage 34) to the Receiver 32, then the Receiver 32 returns a corresponding RESET ACK PDU (stage 36) to the Sender 30. Using the reset procedure, the HFN numbers and status-related STATE variables between the Sender 30 and the Receiver 32 will be re-synchronized, so will be the communication between them.

FIG. 3 illustrates the RLC reset procedure in more detail, using an UE as a Sender 40 and an UTRAN as a Receiver 42. When the reset condition occurs with this configuration, the Sender 40 will initiate a reset procedure. Assume at stage 44, the Sender 40 has its UL Hyper Frame Number (UL HFN)=x and its DL Hyper Frame Number (DL HFN)=y1 (stage 44). Meantime the Receiver 42 has its UL HFN=x1 and its DL HFN=y (stage 46). The Sender 40 prepares a Reset PDU with its HFNI=x and RSN=0. The Sender in stage 48 passes the Reset PDU (RSN=0, and HFNI=x) down to the lower communication layers e.g., MAC or Physical Layer, where this Reset PDU (RSN=0, and HFNI=x) will be sent through a designated connecting channel to the Receiver 42. Afterward, the Sender 40 in stage 50 stops sending or receiving data through its regular communication channel. Once the Receiver 42 receives the particular Reset PDU (RSN=0, and HFNI=x), it will return a Reset ACK PDU (RSN=0, and HFNI=y) through the designated connecting channel to the Sender 42 (stage 52). Afterward, the Receiver 42 in stage 54 also resets its STATE variables. Then the Receiver starts sending DL AM PDUs with DL HFN=y+1 and receiving UL AM PDU with UL HFN=x+1, where y is the value of the HFNI field of the Reset ACK PDU. Upon receiving the Reset ACK PDU (RSN=0, and HFNI=y) from the Receiver 42, the Sender 40 will reset its STATE variables and start to send and receive data with its UL HFN=x+1 and DL HFN= y+1 (stage 56). Therefore, the Hyper Frame Numbers (HFNs) of the Sender 40 and the Receiver 42 are synchronized with UL HFN=x+1 and DL HFN=y+1.

In the case that the expected Reset ACK PDU is lost during transmission, as shown in FIG. 4, the sender 60 has UL HFN=x and DL HFN=y1 while the receiver has UL HFN=x1, and DL HFN=y as shown in stages 64 and 66. In stage 68, a reset condition triggered, the Sender 60 sends the $1^{st}$ Reset PDU with RSN=0 and HFNI=x to the Receiver 62 through a designated connecting channel. Then the Sender 60 will stop sending and receiving data from the regular channels (stage 70). The Receiver 62 receives the $1^{st}$ Reset PDU and responds with the $1^{st}$ Reset ACK PDU with RSN=0 and HFNI=y in stage 72. Once the Receiver 60 sends out the corresponding Reset ACK PDU (RSN=0 and HFNI=y), it will reset its STATE variables and update its HFNs with UL HFN=x+1 and DL HFN=y+1 in stage 78. Nevertheless, the return Reset ACK PDU is lost (stage 74), after a predetermined time out period expired (Reset timeout), the Sender 60 will send the another ($2^{nd}$) Reset PDU (RSN=0, and HFNI=x) as shown in stage 80. Upon receiving the 2nd Reset PDU (RSN=0 and HFNI=x), the Receiver shall respond by returning a corresponding Reset ACK PDU (RSN=0, and HFNI=y+1 (the current highest HFN) stage 82). Next at the stage 84, the Receiver 62 updates its UL HFN=x+1 and DL HFN=y+2. When the Sender 60 receives the Reset ACK PDU (RSN=0 and HFNI=y+1) before the second Reset Time-out, the Sender 60 will reset its STATE variables and starts to send and receive data with UL HFN=x+1 and DL HFN=y+2 (stage 86). The communication resumes a normal operation and the HFNs of the Sender 60 and the Receiver 62 are synchronized.

Nevertheless, in some cases that the responded Reset ACK PDU is not lost but delayed during the radio transmission. Such delay could happen during the lower layer transmitting scheduling. When the logical channel of this responded Reset ACK PDU has lower transmitting priority than other logical channels that have data to be transmitted. Therefore, as shown in FIG. 5, the Sender 90 does not receive the expected Reset ACK PDU, which still is in the return pipeline, before the time-out expired (stages 98, 102 and 104). The Sender 90 sends another Reset PDU out again (stage 106). Nevertheless, the Sender 90 eventually receives the delayed Reset ACK PDU and another Reset ACK PDU (stages 106, 108 and 114), which responded to the resend Reset PDU and is considered as "out-of-date". The prior art suggests that the Sender will discard the "out-of-date" Reset ACK PDU (stage 112). At the stage 116, the Receiver 92 starts to send and receive data with UL HFN=x+1 and DL HFN=y+2. While the Sender 90 is ready to send and receive data with its UL HFN=x+1 and DL HFN=y+1 (stage 112). It is clear that the DL HFNs between the Sender 90 and the Receiver 92 are out of synchronization.

SUMMARY

Accordingly, in order to obviate the limitations and drawbacks encountered in the prior art, the present invention resolves the problems caused by the delayed Reset PDU in the AM RLC reset procedure.

BRIEF DESCRIPTION OF THE DRAWINGS

Following drawings with reference numbers and exemplary embodiments are referenced for explanation purpose.

DETAILED DESCRIPTION OF THE PREFERRED EMBODIMENTS

Figure 1:
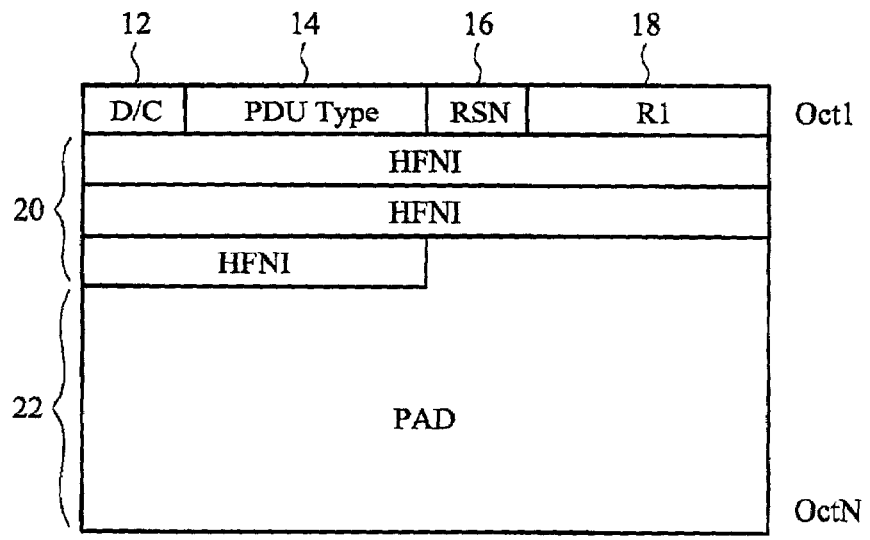
FIG. 1 illustrates the data structure of a regular AM Reset PDU and a regular Reset ACK PDU.
Figure 2:
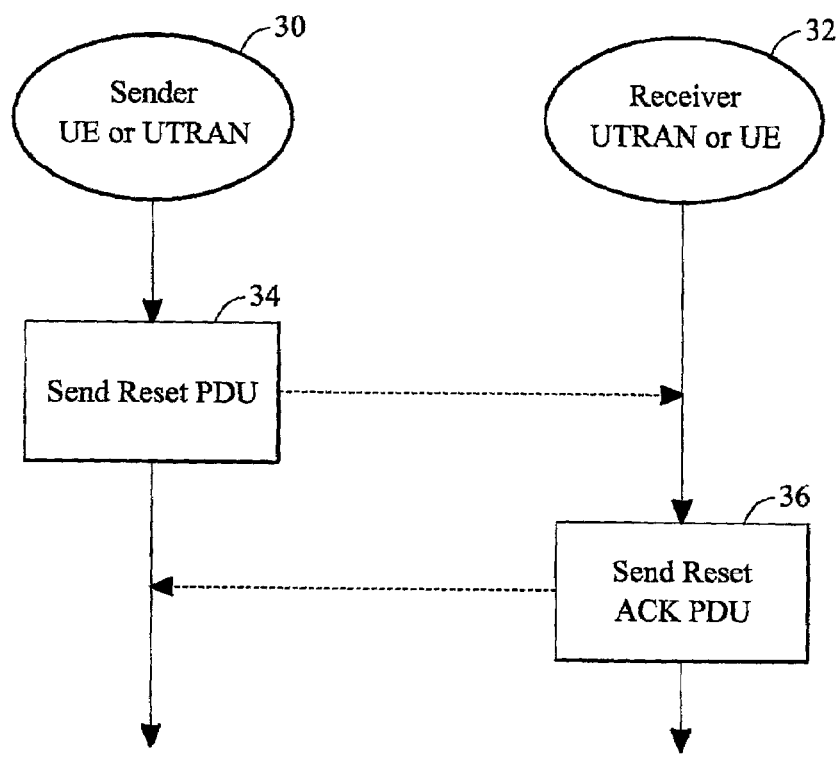
FIG. 2 illustrates a simple normal AM RLC Reset procedure.
Figure 3:
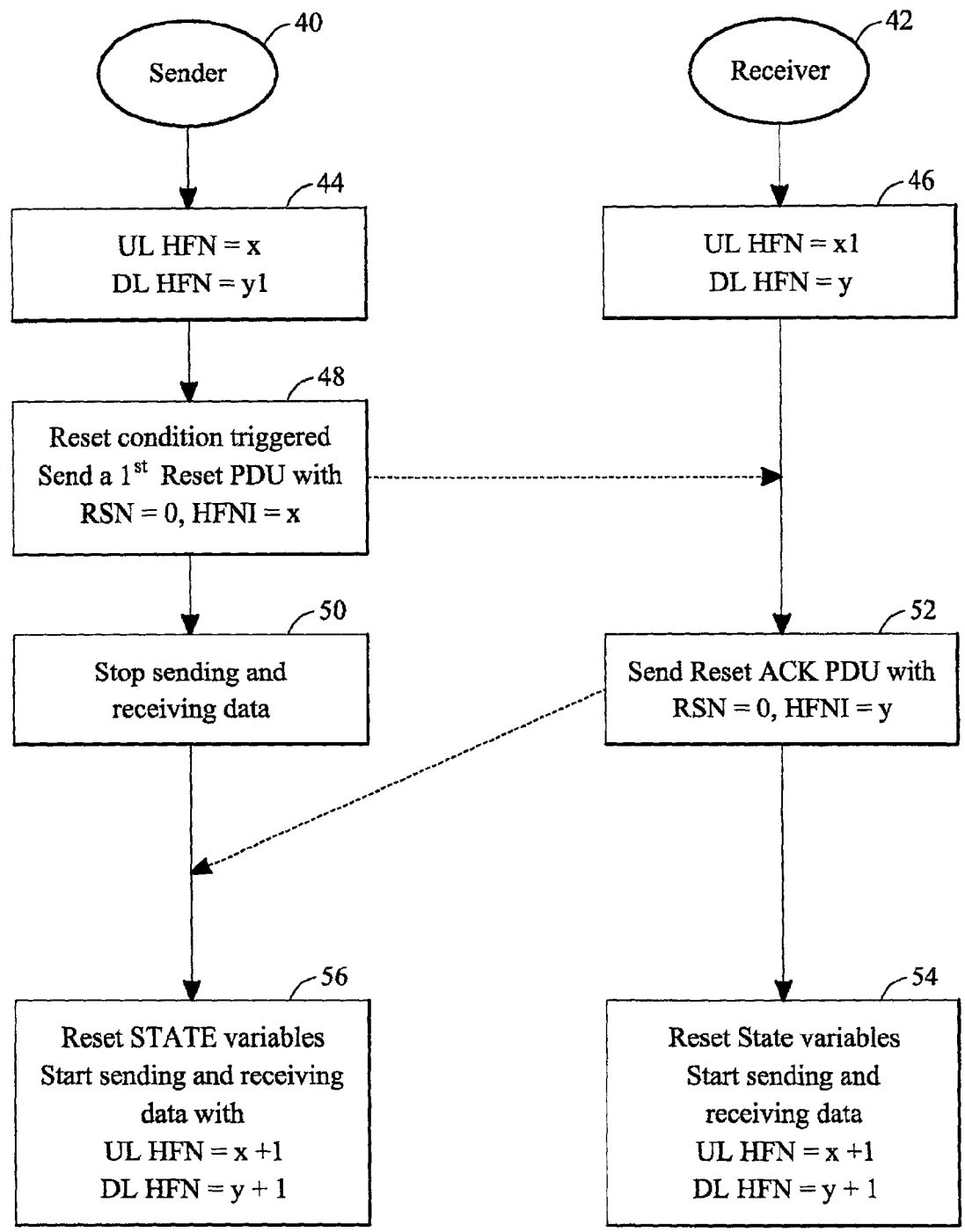
FIG. 3 illustrates a normal AM RLC Reset procedure in more detail.
Figure 4:
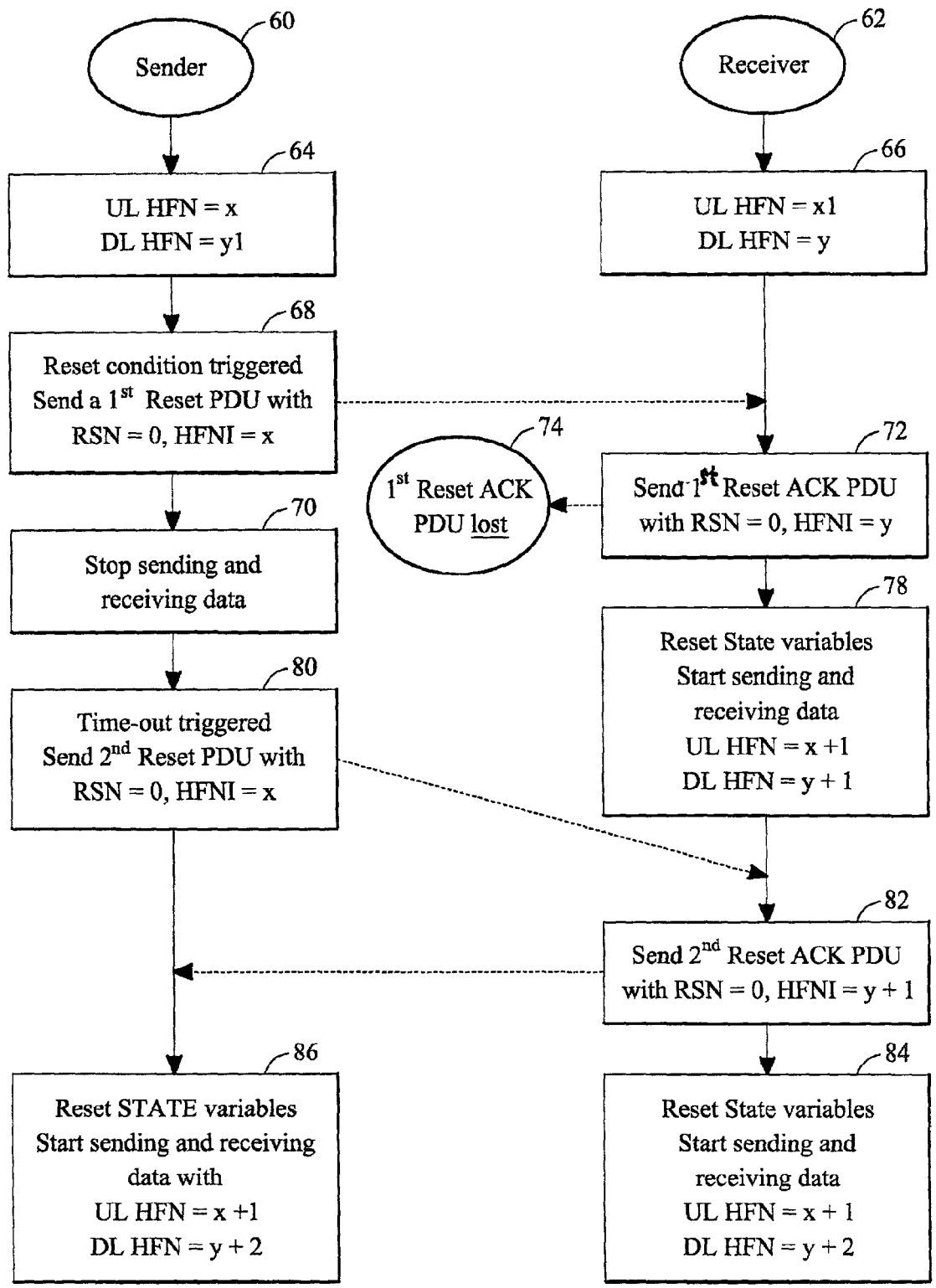
FIG. 4 illustrates an AM RLC Reset procedure with a lost $1^{st}$ Reset ACK PDU.
Figure 5:
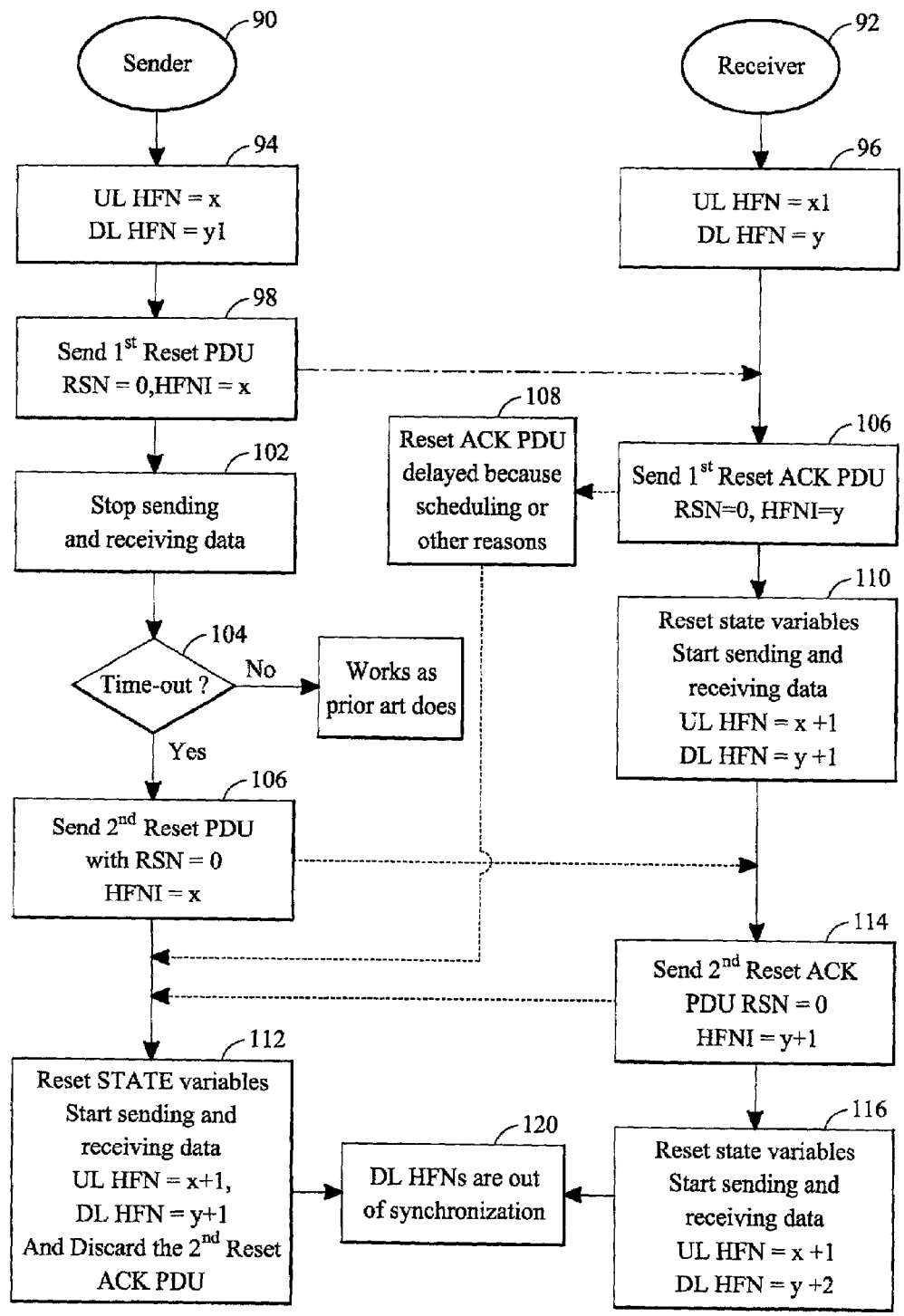
FIG. 5 illustrates an AM RLC Reset procedure with a delayed Reset ACK PDU.

This invention develops a method and system to resolve this potential problem caused by receiving redundant Reset ACK PDUs. Assume that the sender initiates a reset procedure in the AM RLC mode when a reset condition is triggered, whether there is too many retries or received a PDU with erroneous Sequence Number. The Sender sends a first Reset PDU. Upon a time-out period expired, without receiving the responded Reset ACK PDU, The Sender sends a second Reset PDU, which has the same RSN value and HFNI values as the first Reset PDU has. When the Receiver receives either Reset PDU, as described in the prior art, the Receiver will automatically send back one Reset ACK package with updated HFN values, reset itself and update its STATE variables and its HFN values each time. Now the HFN of the transmitting side of the Receiver (DL HFN if UTRAN is the Receiver, UL HFN if UE is the Receiver) has been updated twice, i.e., incremented twice. Meantime, by discarding the out-of-date $2^{nd}$ Reset ACK PDU the Sender will reset only once of its HFN of its receiving side (DL HFN if UE is the Sender, UL HFN if UTRAN is the Sender) based on the value of the first ACK PDU, which is different from the Receiver's current transmitting HFN value as shown in FIG. 5. This is why the Sender and the Receiver encounter the un-synchronization problem when the Sender receives two Reset ACK PDUs (one delayed) in the current AM RLC reset procedure prior art.

Figure 6A:
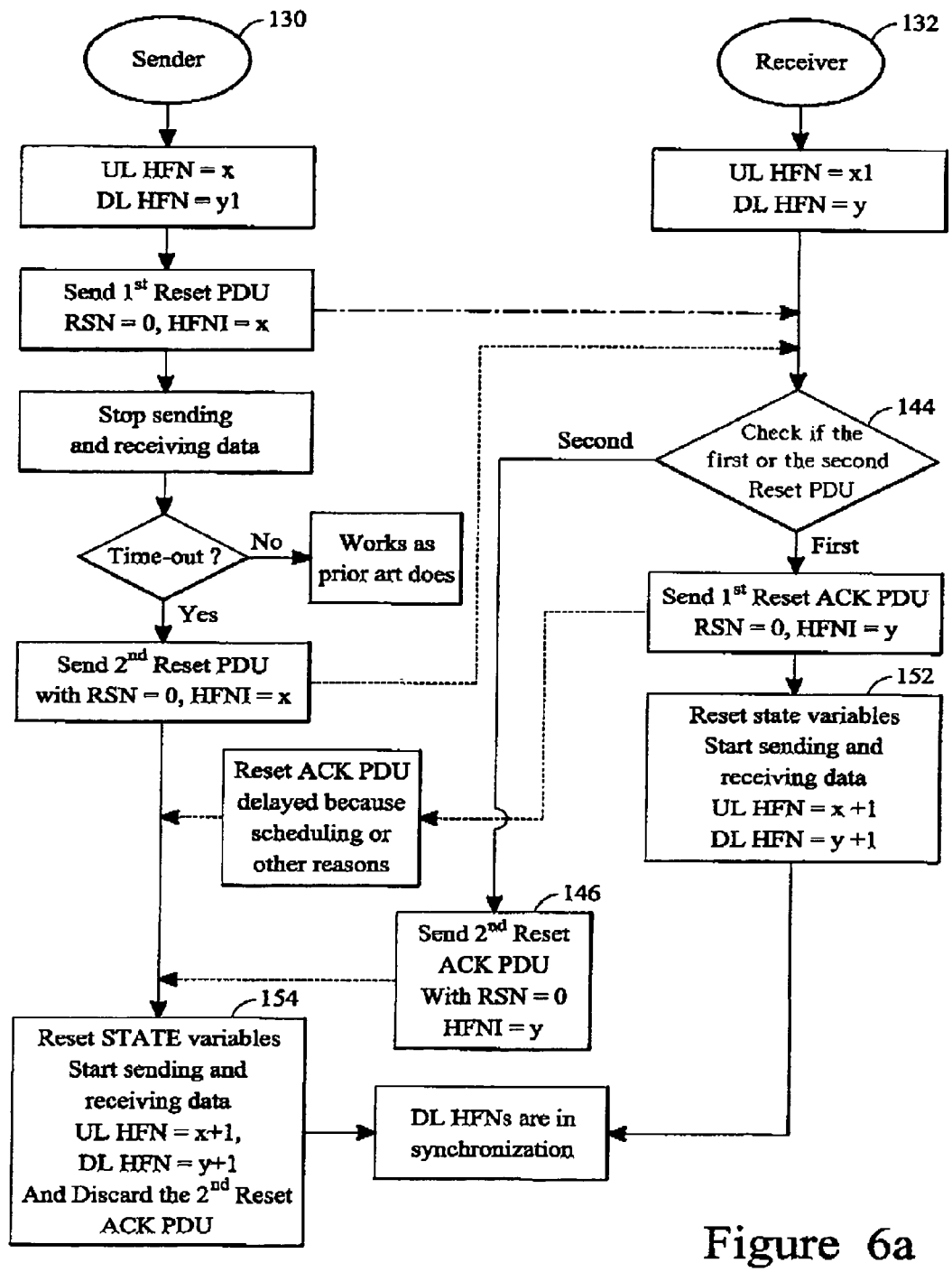
FIG. 6a illustrates a modified AM RLC Reset procedure implemented at the Receiver Side.

Thus, this invention modifies the way the second Reset ACK PDU is handled either in the Sender or in the Receiver. Implemented at the Receiver side only as shown in FIG. 6a, when the Receiver 132 receives the first Reset PDU, it works exactly as the prior art does. In addition, the Receiver 132 will check in-coming Reset PDUs to test whether it is the $1^{st}$ or the $2^{nd}$ Reset PDU (stage 144). The Receiver 132 will react to the $1^{st}$ Reset ACK PDU just likes the prior art does, resets STATE variables, starts sending and receiving data, updates its HFNs values (stage 152). When the second Reset PDU is received, the Receiver 132 does not reset its STATE variables nor update its HFN values. The Receiver 132 will send out a second Reset ACK PDU, which has the same HFN value and RSN as the first Reset ACK PDU has (stage 146). Once the Sender received the second Reset ACK PDU, the Sender will simply discard the second Reset ACK PDU as the prior art does (stage 154). At this point, Both HFN values and STATE variables are synchronized between the Sender and the Receiver.

Figure 6B:
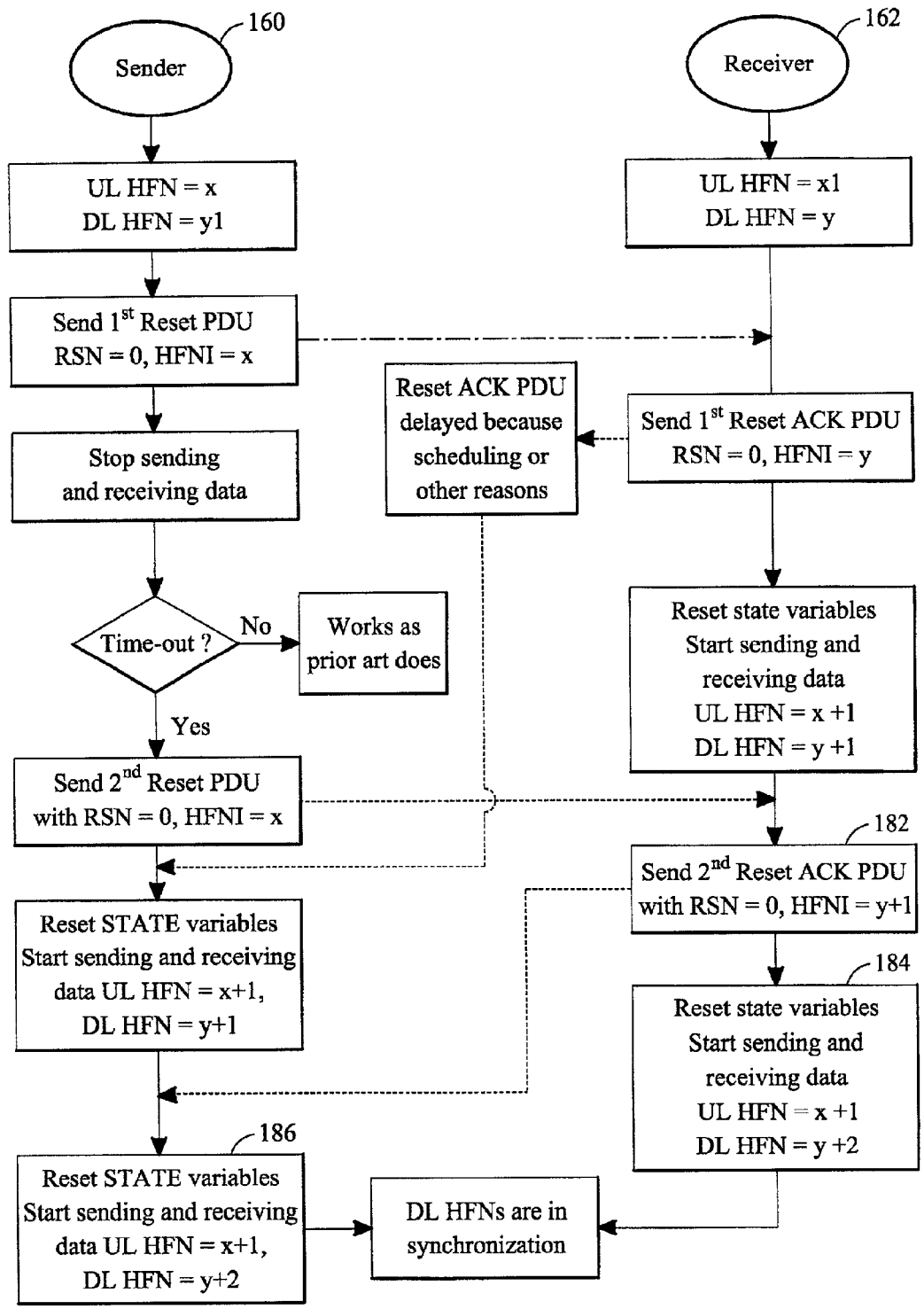
FIG. 6b illustrates a modified AM RLC Reset procedure implemented at the Sender Side.

The problem can also be solved from the Sender 160 as shown in FIG. 6b. Instead of discarding an out-of-date $2^{nd}$ Reset ACK PDU, in this method the Sender will accept the $2^{nd}$ Reset ACK PDU and reset the STATE variables (stage 182, 184 and 186). So at the end of the reset procedure we will have UL HFN=x+1 and DL HFN=y+2 in the Sender, which are the same as what in the Receiver 162.

Figure 6C:
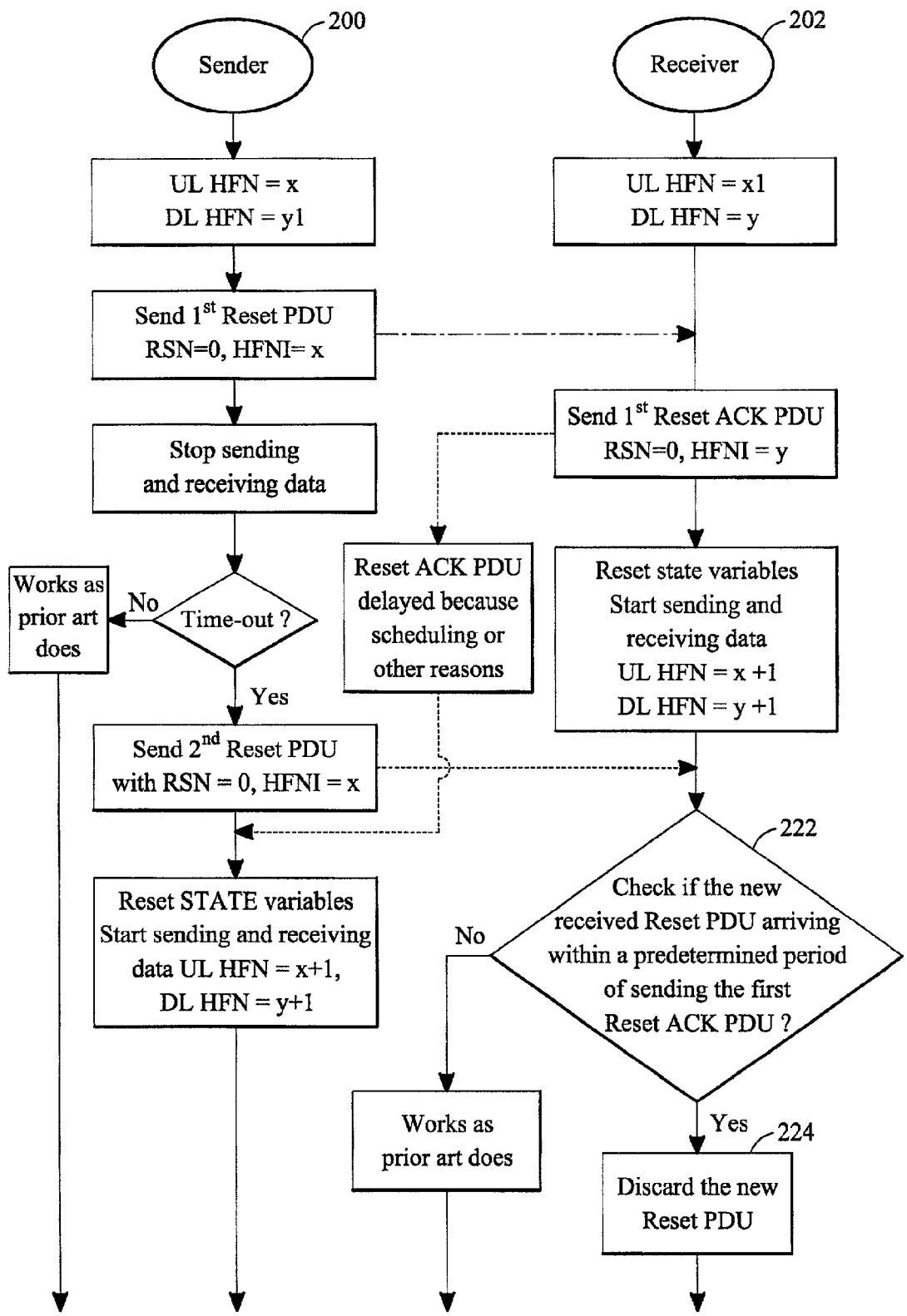
FIG. 6c illustrates another modified AM RLC Reset procedure implemented at the Receiver Side.
Figure 6D:
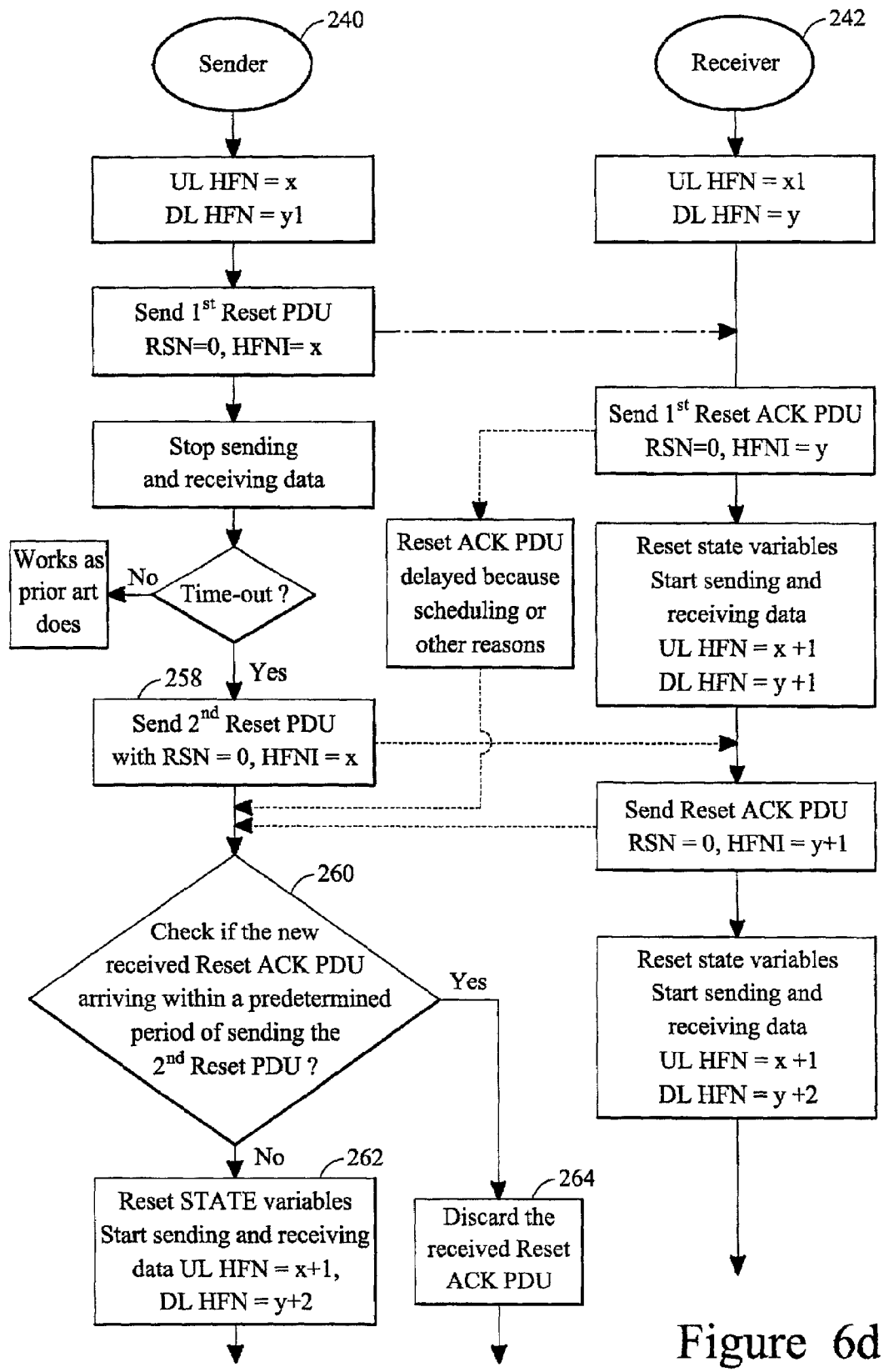
FIG. 6d illustrates another modified AM RLC Reset procedure implemented at the Sender Side.

In addition to the above-mentioned method, assume that the Receiver has responded to the first received Reset PDU and sent out a corresponding Reset ACK PDU. As shown in FIG. 6c, up to this stage both the Sender 200 and the Receiver 202 work the same as the prior art does. Except at the Receiver 202 side, the Receiver 202 will check if it received the $2^{nd}$ Reset PDU within a predetermined time period after it sent out the $1^{st}$ Reset ACK PDU (stage 222). The predetermined time period can be i.e., a time period for the two-way radio transmission delay between the Sender and the Receiver. If the Receiver receives the second Reset PDU within that predefined period, the Receiver should discard the second Reset PDU. Because based on timing, the Sender did not wait long enough time for the arriving of the first responded Reset ACK PDU before the Sender sends the second Reset PDU. Therefore, the Receiver 202 should ignore and discard the second Reset PDU and process other Reset PDUs as usual (stage 222, 224). Of course, the same principle can be implemented at the Sender side. The modification is shown in FIG. 6d. After the Sender 240 has sent the second Reset PDU (stage 258), in stage 260, the Sender 240 will check if it received the Reset ACK PDU within a predetermined time period after it sent out the $2^{nd}$ Reset PDU. As before the predetermined time period can be a time period for the two-way radio transmission delay between the Sender and the Receiver. If it is within that period, the Sender should discard this newly arrived Reset ACK PDU (stage 264). Because based on the timing, this Reset ACK PDU apparently is not the responded ACK PDU for the second Reset PDU. It must be the delayed response for the first Reset PDU from the Receiver. The Sender 240, in stage 262 upon receiving the second Reset ACK PDU, will reset its STATE variables and update its HFNs values based on the $2^{nd}$ Reset ACK PDU. Afterward, the Sender and the Receiver are synchronized.

What is claimed is:

1. A method used in a wireless communication system for performing an acknowledge mode radio link control (AM RLC) reset procedure, the wireless communication system comprising at least a sender and a receiver communicating with each other through a plurality of channels, wherein each of the sender and the receiver contains a set of status-related variables, an upload data package sequential number, and a download data package sequential number for synchronizing data packets exchanged between the sender and the receiver, the AM RLC reset procedure comprising:

transmitting a first reset package with a first reset sequence number and a first upload data package sequential number of the sender to the receiver for indicating the need for resetting the communication connection between the sender and the receiver;

updating the status-related variables and upload and download data package sequential numbers of the receiver in response to receiving the first reset package;

transmitting a first reset acknowledge package with the first reset sequence number and a first download data package sequential number of the receiver to the sender in response to the receiver receiving the first reset package from the sender;

triggering a time-out condition in response to not receiving the first reset acknowledge package within a first predetermined time period of transmitting the first reset package to the receiver;

transmitting a second reset package with the first reset sequence number and the sender's first upload data package sequential number to the receiver;

receiving the first reset acknowledge package from the receiver;

receiving the second reset package from the sender;

updating the status-related variables and the receiver's upload and download data package sequential numbers in response to receiving the second reset package;

transmitting a second reset acknowledge package with the first reset sequence number and a second download data package sequential number of the receiver to the sender in response to the receiver receiving the second reset package from the sender;

updating the sender's status-related variables and the sender's upload and download data package sequential numbers according to validating the receipt of the first reset acknowledge package from the receiver;

receiving the second reset acknowledge package from the receiver; and updating the sender's status-related variables and the sender's upload and download data package sequential numbers according to validating the receipt of the second reset acknowledge package from the receiver.

2. A method used in a wireless communication system for performing an acknowledge mode radio link control (AM RLC) reset procedure, the wireless communication system comprising at least a sender and a receiver communicating with each other through a plurality of channels, wherein each of the sender and the receiver contains a set of status-related variables, an upload data package sequential number, and a download data package sequential number for synchronizing data packets exchanged between the sender and the receiver, the AM RLC reset procedure comprising:

transmitting a first reset package with a first reset sequence number and a first upload data package sequential number of the sender to the receiver for indicating the need for resetting the communication connection between the sender and the receiver;

receiving the first reset package from the sender;

updating the status-related variables and the receiver's upload and download data package sequential numbers in response to receiving the first reset package;

transmitting a first reset acknowledge package with the first reset sequence number and a first download data package sequential number of the receiver to the sender in response to the receiver receiving the first reset package from the sender;

triggering a time-out condition in response to not receiving the first reset acknowledge package within a first predetermined time period of transmitting the first reset package to the receiver;

transmitting a second reset package with the first reset sequence number and the sender's first upload data package sequential number to the receiver;

receiving the first reset acknowledge package from the receiver;

updating the sender's status-related variables and the sender's upload and download data package sequential numbers according to validating the receipt of the first reset acknowledge package from the receiver;

receiving the second reset package from the sender;

discarding the second reset package without updating the receiver's status-related variables and the receiver's upload and download data package sequential numbers if the second reset package is received within a second predetermined time period of transmitting the first reset acknowledge package; and if the second reset package is received by the receiver after the second predetermined time period has elapsed, the receiver performing the following steps;

updating the status-related variables and the receiver's upload and download data package sequential numbers in response to receiving the second reset package; and transmitting a second reset acknowledge package with the first reset sequence number and a second download data package sequential number of the receiver to the sender in response to the receiver receiving the second reset package from the sender.

3. A method used in a wireless communication system for performing an acknowledge mode radio link control (AM RLC) reset procedure, the wireless communication system comprising at least a sender and a receiver communicating with each other through a plurality of channels, wherein each of the sender and the receiver contains a set of status-related variables, an upload data package sequential number, and a download data package sequential number for synchronizing data packets exchanged between the sender and the receiver, the AM RLC reset procedure comprising:

transmitting a first reset package with a first reset sequence number and a first upload data package sequential number of the sender to the receiver for indicating the need for resetting the communication connection between the sender and the receiver;

receiving the first reset package from the sender;

updating the status-related variables and the receiver's upload and download data package sequential numbers in response to receiving the first reset package;

transmitting a first reset acknowledge package with the first reset sequence number and a first download data package sequential number of the receiver to the sender in response to the receiver receiving the first reset package from the sender;

triggering a time-out condition in response to not receiving the first reset acknowledge package within a first predetermined time period of transmitting the first reset package to the receiver;

transmitting a second reset package with the first reset sequence number and the sender's first upload data package sequential number to the receiver;

receiving the first reset acknowledge package from the receiver;

discarding the first reset acknowledge package without updating the sender's status-related variables and the sender's upload and download data package sequential numbers if the first reset acknowledge package is received within a second predetermined time period of transmitting the second reset package;

receiving the second reset package from the sender;

updating the status-related variables and the receiver's upload and download data package sequential numbers in response to receiving the second reset package; and transmitting a second reset acknowledge package with the first reset sequence number and a second download data package sequential number of the receiver to the sender in response to the receiver receiving the second reset package from the sender.

4. The method of claim 3, further comprising if the first reset acknowledge package is received after the second predetermined time period has elapsed, the sender performing the following steps:

receiving the first reset acknowledge package from the receiver; and updating the sender's status-related variables and the sender's upload and download data package sequential numbers according to validating the receipt of the first reset acknowledge package from the receiver.

* * * * *